United States Patent
Eisler et al.

(10) Patent No.: US 7,112,378 B2
(45) Date of Patent: Sep. 26, 2006

(54) APPARATUS AND METHOD FOR DYNAMIC CONTROL OF AN ENTHALPY WHEEL IN A FUEL CELL SYSTEM

(75) Inventors: Elwood A. Eisler, Albany, NY (US); David A. Gutenmann, Clifton Park, NY (US)

(73) Assignee: Plug Power Inc., Latham, NY (US)

( * ) Notice: Subject to any disclaimer, the term of this patent is extended or adjusted under 35 U.S.C. 154(b) by 486 days.

(21) Appl. No.: 10/264,547

(22) Filed: Oct. 4, 2002

(65) Prior Publication Data

US 2003/0091881 A1    May 15, 2003

Related U.S. Application Data

(60) Provisional application No. 60/335,410, filed on Oct. 31, 2001.

(51) Int. Cl.
  *H01M 8/04* (2006.01)
(52) U.S. Cl. .............................. 429/13; 429/23; 429/24; 429/26
(58) Field of Classification Search ................... 429/13, 429/22, 23, 24, 25, 26, 34
  See application file for complete search history.

(56) References Cited

U.S. PATENT DOCUMENTS

| | | | | |
|---|---|---|---|---|
| 6,013,385 | A | 1/2000 | DuBose | 429/17 |
| 6,329,090 | B1 * | 12/2001 | McElroy et al. | 429/13 |
| 6,436,562 | B1 | 8/2002 | DuBose | 429/13 |
| 6,601,402 | B1 * | 8/2003 | Dunham | 429/26 X |
| 2002/0071979 | A1 * | 6/2002 | DuBose et al. | 429/26 |
| 2002/0182463 | A1 * | 12/2002 | Jones et al. | 429/23 |

* cited by examiner

*Primary Examiner*—Stephen J. Kalafut
(74) *Attorney, Agent, or Firm*—Trop, Pruner & Hu, P.C.

(57) ABSTRACT

The invention relates to systems and associated methods of operating fuel cell systems where the rotational speed of a reactant humidification enthalpy wheel is dynamically controlled according to various process variables. In one embodiment, a method is provided for operating a fuel cell system, including the following steps: (1) rotating a porous desiccant material about a rotational axis; (2) flowing air through the desiccant material in a direction parallel to the rotational axis to a cathode inlet of a fuel cell; (3) flowing cathode exhaust from the fuel cell through the desiccant material; (4) monitoring a process performance variable; (5) detecting a change in a value of the process performance variable; and (6) varying a rotational speed of the desiccant material in response to the detected change in the value of the process performance variable.

7 Claims, 10 Drawing Sheets

APPARATUS AND METHOD FOR DYNAMIC CONTROL OF AN ENTHALPY WHEEL IN A FUEL CELL SYSTEM

CROSS REFERENCE TO RELATED APPLICATIONS

This application claims priority under 35 USC 119(e) from U.S.

Provisional Application No. 60/335,410, filed Oct. 31, 2001, naming Eisler as inventor, and titled "VARIABLE SPEED ENTHALPY WHEEL." That application is incorporated herein by reference in its entirety and for all purposes.

BACKGROUND

The invention relates to systems and associated methods of operating fuel cell systems where the rotational speed of a reactant humidification enthalpy wheel is dynamically controlled according to various process variables.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

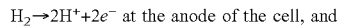
$H_2 \rightarrow 2H^+ + 2e^-$ at the anode of the cell, and

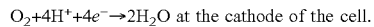
$O_2 + 4H^+ + 4e^- \rightarrow 2H_2O$ at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The PEM and its adjacent pair of catalyst layers are often referred to as a membrane electrode assembly (MEA). An MEA sandwiched by adjacent GDL layers is often referred to as a membrane electrode unit (MEU).

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time. Fuel cell systems adapted to accommodate variable loads are sometimes referred to as "load following" systems.

Fuel cells generally operate at temperatures much higher than ambient (e.g., 50–80° C. or 120–180° C.), and the fuel and air streams circulated through the fuel cells typically include water vapor. For example, reactants associated with sulphonated fluorocarbon polymer membranes must generally be humidified to ensure the membranes remain moist during operation. In such a system, water may condense out of a process stream where the stream is cooled below its dew point. For example, if the anode and cathode exhaust streams are saturated with water vapor at the stack operating temperature, water will tend to condense from these streams as they cool after leaving the stack. Similarly, the humidity and temperature conditions of other process streams may also produce condensation. It may be desirable to remove condensate from a process stream in a fuel cell system process stream. As examples, such condensate can interfere with the flow of process streams, can potentially build to levels that can flood portions of the system, and can also cause problems if allowed to freeze (e.g., in an outdoor unit that is not in service).

The term "integrated fuel cell system" (also commonly referred to simply as "fuel cell system") generally refers to a fuel cell stack that is coupled to components and subsystems that support the operation of the stack. For example, this could refer to a fuel cell stack that is connected to a power conditioning device that converts direct current from the fuel cell into alternating current similar to that available from the grid. It might also refer to a system equipped with a fuel processor to convert a hydrocarbon (e.g., natural gas, propane, methanol, etc.) into a hydrogen rich stream (e.g., reformate) for use in the fuel cell. An integrated fuel cell system may also include a control mechanism to automate at least some portion of the operation of the system. Integrated fuel cell systems may include a single controller common to the entire system, or may include multiple controllers specific to various parts of the system. Likewise, the operation of integrated fuel cell systems may be fully or partially automated. Also, an integrated fuel cell system may or may not be housed in a common enclosure.

There is a continuing need for integrated fuel cell systems and associated process methods designed to achieve objectives including the forgoing in a robust, cost-effective manner.

SUMMARY

The invention relates to systems and associated methods of operating fuel cell systems where the rotational speed of a reactant humidification enthalpy wheel is coordinated with other process variables. The invention relates not only to the monolithic cylindrical zeolite enthalpy wheel cores that have been used in the prior art, but more generally to any desiccant media that is rotated to function in this manner.

In one aspect, a fuel cell system is provided that includes an enthalpy wheel assembly. The assembly includes an enthalpy wheel coupled to a variable speed motor. The motor is adapted to rotate the enthalpy wheel (e.g., in the range of 5 to 33 revolutions per minute). The assembly includes a first inlet, a first outlet, a second inlet, and a second outlet.

A fuel cell is coupled to the enthalpy wheel that has a cathode inlet and a cathode outlet. The cathode inlet is coupled to the first outlet of the enthalpy wheel assembly. The cathode outlet is coupled to the second inlet of the enthalpy wheel assembly. The first inlet of the enthalpy wheel is coupled to a supply of air, and the second outlet is adapted to vent cathode exhaust from the enthalpy wheel. A controller is provided with a process variable sensor and is coupled to the enthalpy wheel motor, such that the controller is adapted to vary a speed of the motor in response to a signal from the process variable sensor.

As examples, the process variable can be an electrical current output from the fuel cell, a temperature of the fuel cell, a stack coolant inlet temperature, or other systems parameters associated with the performance or condition of the system.

In one embodiment, the controller is adapted to adjust the motor to a first speed when the signal from the process variable sensor is within a first range, and wherein the controller is adapted to adjust the motor to a second speed when the signal from the process variable sensor is within a second range.

In another embodiment, the controller is adapted to utilize a lookup table to vary a rotational speed of the enthalpy wheel according to the signal from the process variable sensor. The controller can also be adapted to utilize a lookup table to vary a rotational speed of the enthalpy wheel as a function of process variables including stack coolant inlet temperature and stack current output, as in the case where the data of the lookup table is regressed into a mathematical expression.

Preferably, the fuel cell forms a portion of a fuel cell stack. Also, the fuel cell is preferably a PEM fuel cell having an operating temperature below 100° C. (e.g., in the range of 60–70° C.).

In some embodiments, the controller is coupled to a pump adapted to circulate a coolant through the fuel cell stack. The controller is further coupled to a first temperature sensor adapted to indicate a stack inlet temperature of the coolant, and to a second temperature sensor adapted to indicate a stack outlet temperature of the coolant. The controller can be adapted in this manner to vary an output of the pump to maintain a desired temperature differential (e.g., 6° C.) between the stack inlet and outlet temperatures of the coolant. As examples, the controller can be adapted to increase the differential when the stack inlet temperature of the coolant is below a predetermined threshold (e.g., in the range of 60–70° C.), and can be adapted to decrease the differential when the stack inlet temperature of the coolant is above a predetermined threshold. The controller can also be adapted to vary the differential to maintain a cathode inlet temperature higher than the stack coolant inlet temperature.

In some embodiments, the fuel cell forms a portion of a fuel cell stack adapted to provide less than 6 kilowatts of continuous power (e.g., to a residential or commercial building). Fuel cell systems of other sizes can also be used with the invention. The system can further comprise a blower coupled to the controller and adapted to provide an air flow to the first inlet of the enthalpy wheel, wherein the controller is adapted to maintain the air flow, e.g., in the range of 1.5 to 2.5 stoich. As previously discussed, in this context, a stoich is defined as the amount of reactant theoretically required to supply a given electrical load, assuming all of the reactant is consumed in the fuel cell.

In one embodiment, the controller is adapted to maintain the speed of the enthalpy wheel motor in a first range when the stack inlet temperature of the coolant is in the range 61–65° C., in a second range when the stack inlet temperature of the coolant is below the range 61–65° C., and in a third range when the stack inlet temperature of the coolant is above the range 61–65° C. For example, in one embodiment, a lower limit of the first range is greater than 10 revolutions per minute and an upper limit of the first range is less than 20 revolutions per minute, the second range is less than 10 revolutions per minute, and the third range is greater than 20 revolutions per minute.

In another aspect, a method is provided for operating a fuel cell system, including the following steps: (1) rotating a porous desiccant material about a rotational axis; (2) flowing air through the desiccant material in a direction parallel to the rotational axis to a cathode inlet of a fuel cell; (3) flowing cathode exhaust from the fuel cell through the desiccant material; (4) monitoring a process performance variable; (5) detecting a change in a value of the process performance variable; and (6) varying a rotational speed of the desiccant material in response to the detected change in the value of the process performance variable.

In some embodiments, the step of varying the rotational speed can include adjusting the rotational speed to a first speed when a value of the process performance variable is within a first range, and adjusting the rotational speed to a second speed when the value of the process performance variable is within a second range.

In some embodiments, the step of varying the rotational speed can include utilizing a lookup table (or a mathematical regression of data) to vary the rotational speed of the desiccant material according to the detected change in the value of the process performance variable.

In some embodiments, the fuel cell forms a portion of a fuel cell stack, and the method further includes circulating a coolant through the fuel cell stack, and varying a flow of coolant through the fuel cell stack to maintain a desired differential between a stack inlet and a stack outlet temperature of the coolant.

Embodiments may also include increasing the differential when the stack inlet temperature of the coolant is below a predetermined threshold, and decreasing the differential when the stack inlet temperature of the coolant is above a predetermined threshold. Embodiments may also include varying the differential to maintain a cathode inlet temperature higher than the stack coolant inlet temperature.

In another aspect, a method of operating a fuel cell system is provided that includes the following steps: (1) rotating an enthalpy wheel; (2) flowing cathode exhaust from a fuel cell stack through the enthalpy wheel; (3) flowing air through the enthalpy wheel to increase the humidity of the air; (4) flowing the humidified air from the enthalpy wheel to a cathode electrode chamber of the fuel cell stack; (5) flowing hydrogen through an anode electrode chamber of the fuel cell stack to produce an amount of electrical current; (6) supplying the electrical current to a load; (7) increasing a rotational speed of the enthalpy wheel to increase a dew point temperature of the humidified air fed to the fuel cell from the enthalpy wheel; and (8) decreasing the rotational speed of the enthalpy wheel to decrease the dew point temperature of the humidified air fed to the fuel cell from the enthalpy wheel.

Some embodiments may further include: (1) flowing a coolant through the fuel cell stack; (2) varying a stack inlet temperature of the coolant to maintain the stack inlet temperature of the coolant within a predetermined threshold; and (3) varying the flow of the coolant through the stack to maintain a desired temperature differential between the stack inlet temperature of the coolant and a stack outlet temperature of the coolant.

Embodiments of such methods may also include varying the temperature differential to maintain a cathode inlet temperature higher than the stack coolant inlet temperature; and utilizing a lookup table to adjust the rotational speed of the enthalpy wheel according to a stack inlet temperature of the coolant.

Additional embodiments of the systems and methods of the invention can also include any of the features and techniques described herein, either alone or in combination.

Advantages and other features of the invention will become apparent from the following description, drawings and claims.

DETAILED DESCRIPTION OF CERTAIN EMBODIMENTS

Figure 1:
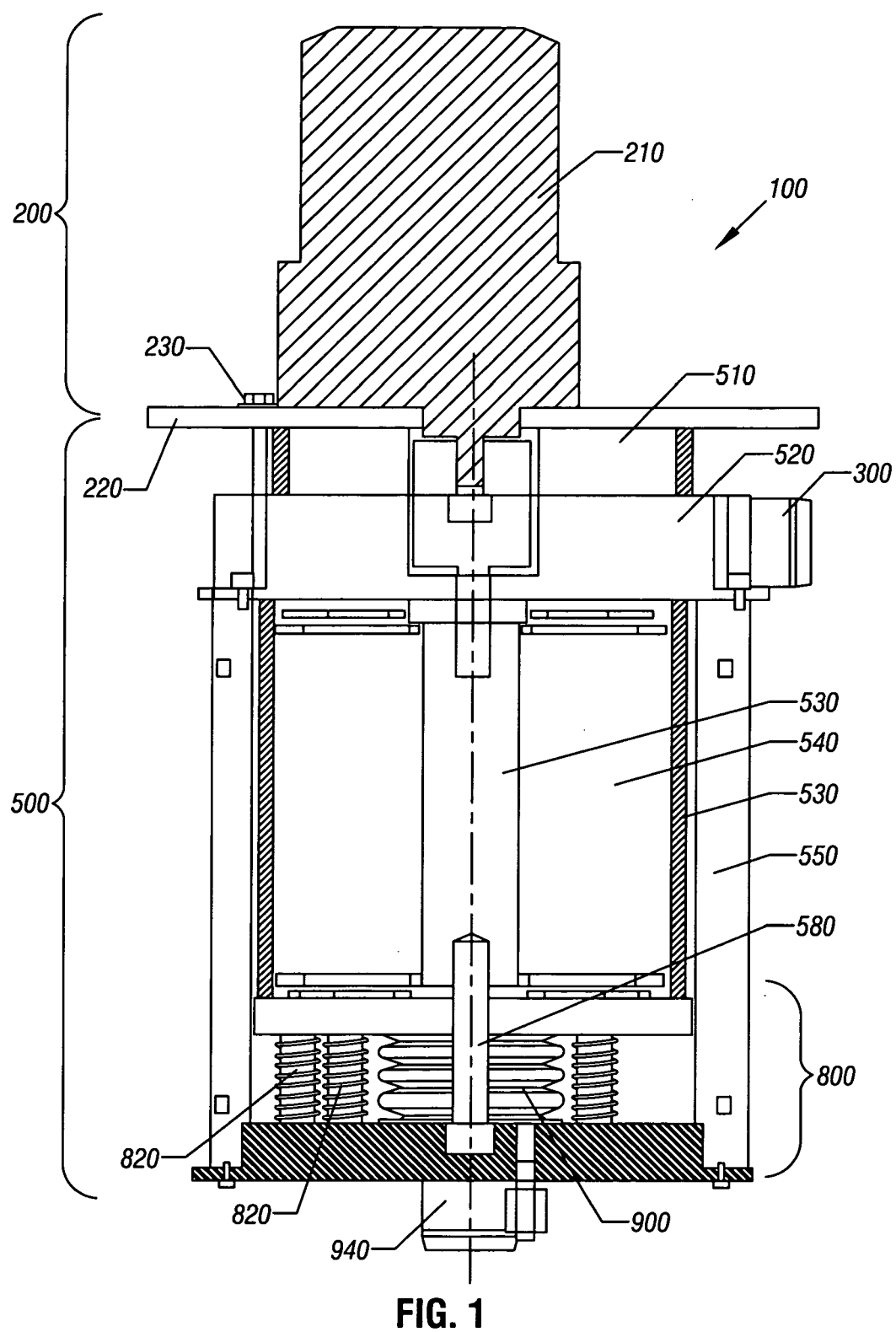
FIG. 1 is a cross-sectional view of an enthalpy wheel.
Figure 2:
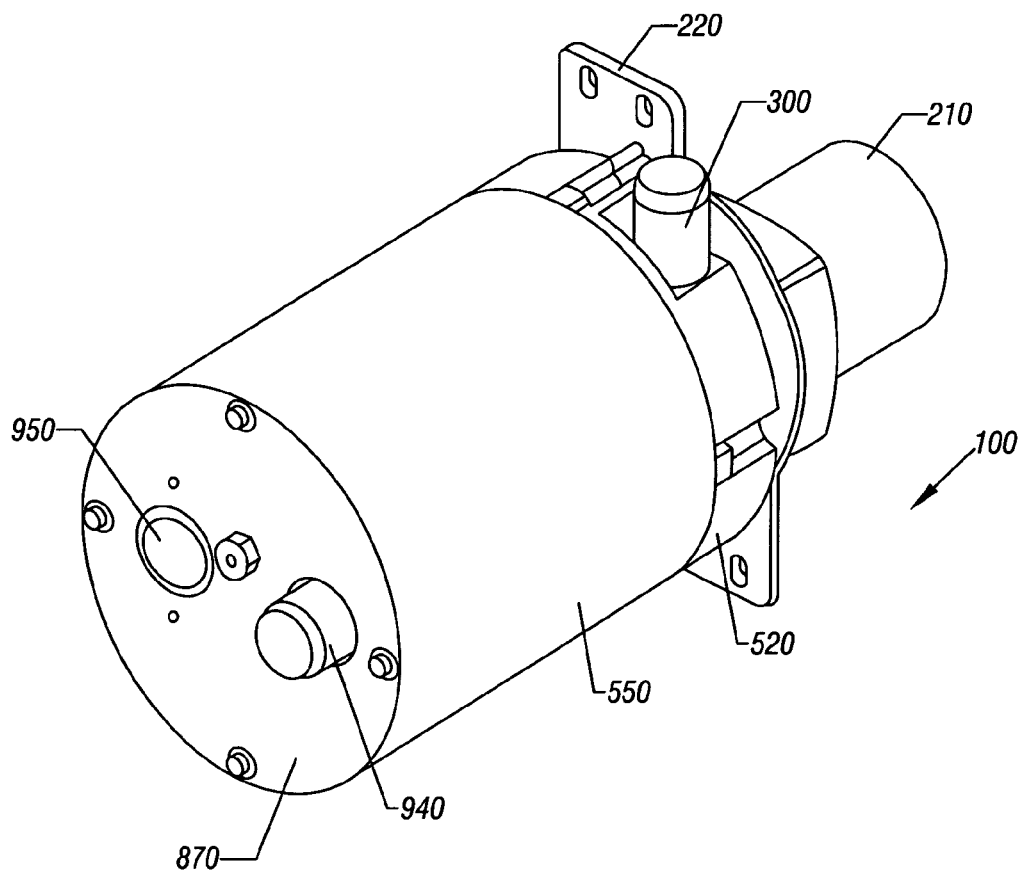
FIG. 2 is a perspective view of an enthalpy wheel.
Figure 3:
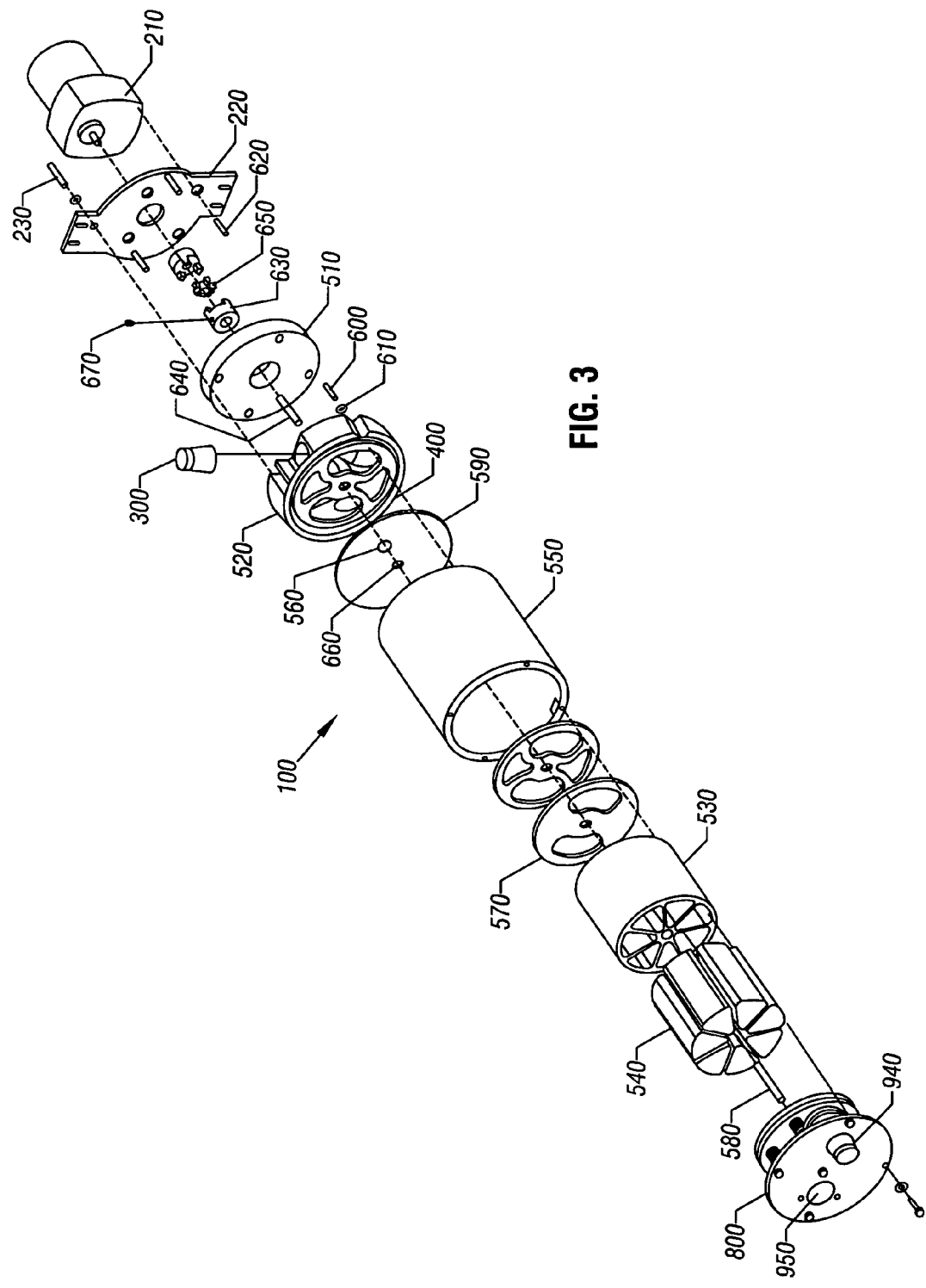
FIG. 3 is an exploded view of an enthalpy wheel.

Referring to FIG. 1, a cross-sectional view is shown of an enthalpy wheel 100 including a motor unit 200, a tube 300, a tube 400, a housing unit 500 and a subassembly 800. FIGS. 2 and 3 show perspective and exploded views, respectively, of enthalpy wheel 100. Motor unit 200 includes a motor 210, a mounting bracket 220 and a cap screw 230. Housing unit 500 includes a spacer 510, a cap 520, a rotor 530, a desiccant material 540, a housing 550, a seal 560 (e.g., a Teflon®) seal), a plate 570, a shaft 580 (e.g., a floating end shaft) an O-ring 590, a cap screw 600, a washer 610 (e.g., a flat washer), a screw 620 (e.g., a machine screw), a hub 630 (e.g., a lovejoy coupling hub), a shaft 640 (e.g., a fixed end shaft), a spider 650 (e.g., a lovejoy coupling spider), a sleeve bearing 660, a screw 670 (e.g., a coupling set screw) and a subassembly 800. Screw 620, hub 630, spider 650 and screw 670 form a coupling between motor 210 and rotor 530. Desiccant material 540, sometimes referred to as an enthalpy wheel "core", generally forms a cylindrical shape (e.g., see housing 530) having a length and diameter each of about 8 to 10 inches. Such a system is discussed in U.S. Pat. No. 6,329,090.

Figure 4:
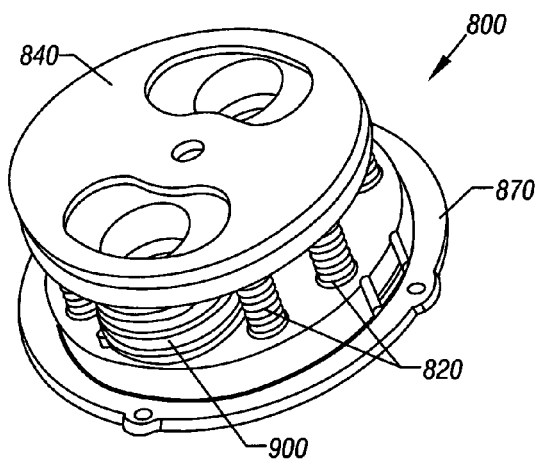
FIG. 4 is a perspective view of an enthalpy wheel subassembly.
Figure 5:
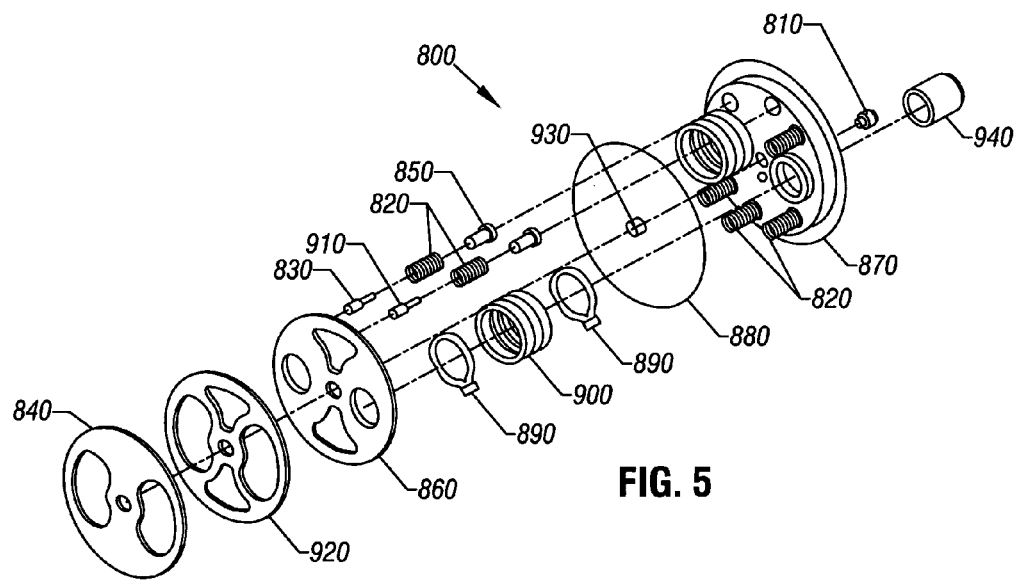
FIG. 5 is an exploded view of an enthalpy wheel subassembly.

FIGS. 4 and 5 show perspective and exploded views, respectively, of subassembly 800 which is designed to maintain a substantially constant pressure against rotor 530 during operation of enthalpy wheel 100. Subassembly 800 includes an adaptor 810, springs 820, a spring post 830, a plate 840 (e.g., a wear plate), a spring seat 850, a floating plate 860, a cap 870, an O-ring plate 880, a cable tie 890, a bellow 900 (e.g., a floating bellow), a spring post 910, a foam piece 920 (e.g., a sponge), a sleeve bearing 930, and a tube 940, an opening 950. Foam piece 920, or an equivalent compliance element, accounts for discrepancies in the flatness of floating plate 860 and plate 840. This assists in keeping a relatively constant force on rotor 530. Springs 820 account for relatively large length changes to help keep a relatively constant force on rotor 530. Typically, tube 940 is in fluid communication with tube 400, and opening 950 is in fluid communication with tube 300.

The ability of subassembly 800 to keep a relatively constant force on rotor 530 results in a relatively small change in the torque used to turn rotor 530 as the temperature of wheel 100 changes during use. For example, in some embodiments, the torque used to turn rotor 530 during use of wheel 100 increases by less than about 30 foot-pounds as the temperature of wheel 100 is increased from about 25° C. to about 70° C. (e.g., less than about 20 foot-pounds, less than about 10 foot-pounds, less than about five foot-pounds). In certain embodiments, the torque used to turn rotor 530 during use of wheel 100 (e.g., at a temperature of about 70° C.) is less than about 50 foot-pounds (e.g., less than about 40 foot-pounds, less than about 30 foot-pounds, less than about 25 foot-pounds).

Figure 6:
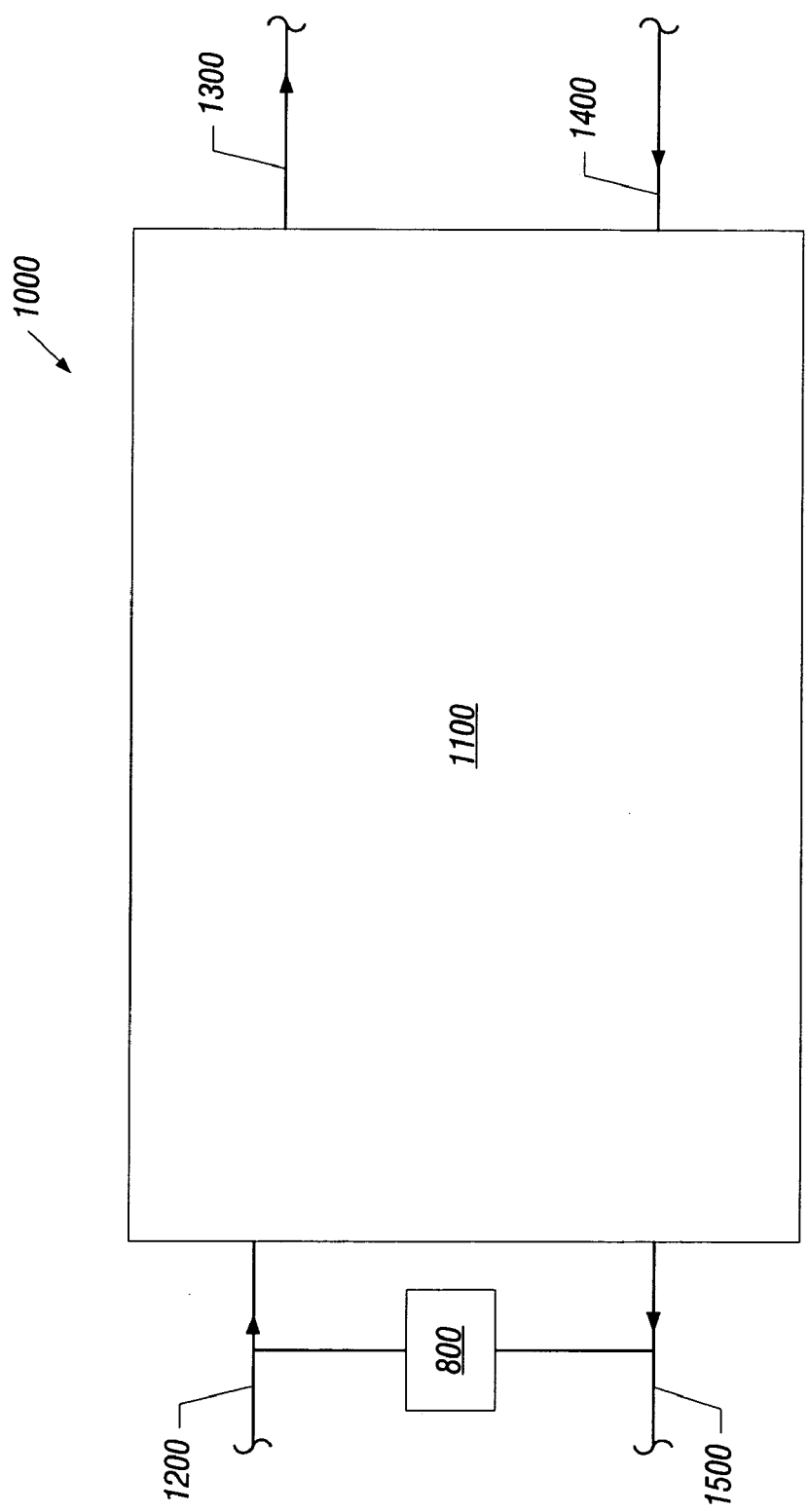
FIG. 6 shows a fuel cell system.

FIG. 6 shows a fuel cell system 1000 including a fuel cell stack 1100 containing a plurality of PEM fuel cells, a cathode gas inlet stream 1200, a cathode gas outlet stream 1500, an anode gas inlet stream 1400, an anode gas outlet stream 1300 and enthalpy wheel 800 in fluid communication with gas streams 1200 and 1500. Without wishing to be bound by theory, in general, it is believed that enthalpy wheel 800 operates by transferring sensible heat and latent heat contained in a gas mixture present in a gas stream (e.g., gas stream 1500) to a relatively dry gas mixture present in a gas stream (e.g., gas stream 1200). It is generally preferable that the temperature and flow of the cathode exhaust 1500 from the fuel cell are configured such that the water removed from the stack 110 is in vapor form.

For example, a coolant circulated through the stack 110 can be introduced to the stack 1100 at a desired temperature and at a flow that is adjusted to provide a desired temperature differential through the stack 1100. In one embodiment having a PEM fuel cell stack operating in a temperature range of 60–70° C. (e.g., reactant inlet temperatures of 63° C.), this stack temperature is achieved by introducing coolant to the stack at the desired stack operating temperature. As a further example, for such a system designed for a continuous power output between about 2.5 to 6 kilowatts and operating with cathode stoichiometric air flow of about 2 to 2.5 stoich, it is generally preferable to adjust the coolant flow through the stack 1100 to achieve a temperature differential in the coolant of about 6° C. through the stack 1100.

Referring back to FIGS. 1, 2, and 3, enthalpy wheel 100 is rotationally driven and desiccant 540 is formed of a material (e.g., acrylic fiber) which is chemically inert to de-ionized water and that is coated with a material which acts as a water-selective molecular sieve, such as a zeolite. Other arrangements of desiccant medias can also be used. The mass of desiccant 540 transfers sensible heat from a gas mixture present one gas stream (e.g. gas stream 1500) to a gas mixture present in a different gas stream (e.g., gas stream 1200). The water-selective molecular sieve traps and transfers water, and therefore latent heat, from a gas mixture present in gas one stream (e.g., gas stream 1500) to a gas mixture present in a different gas stream (e.g., gas stream 1200). Examples of system including enthalpy wheels are disclosed in, for example, U.S. Pat. No. 6,329,090.

Since the enthalpy of the cathode exhaust stream flowed through the wheel is much greater than the enthalpy of the ambient air fed through the enthalpy wheel 100 for humidification, the system can generally be operated without the need to control the ambient air temperature. For example, in such a system as previously described, ambient air temperatures can vary in the range of 20–65° C. and still be exhausted from the enthalpy wheel 100 within a few degrees of the cathode exhaust fed through the enthalpy wheel 100. As examples, in some systems, ambient air is taken directly from outside a system enclosure, whereas is other systems, the ambient air can be taken from within the system enclosure so that it is partially preheated by the system. In some embodiments, the system may include a thermal management system to maintain the temperature of ambient air fed to the enthalpy wheel 100 within a desired range. In other cases, the controllers of such systems may also be configured to shut a system down when the available fresh air temperature is outside such an operating range.

Figure 7:
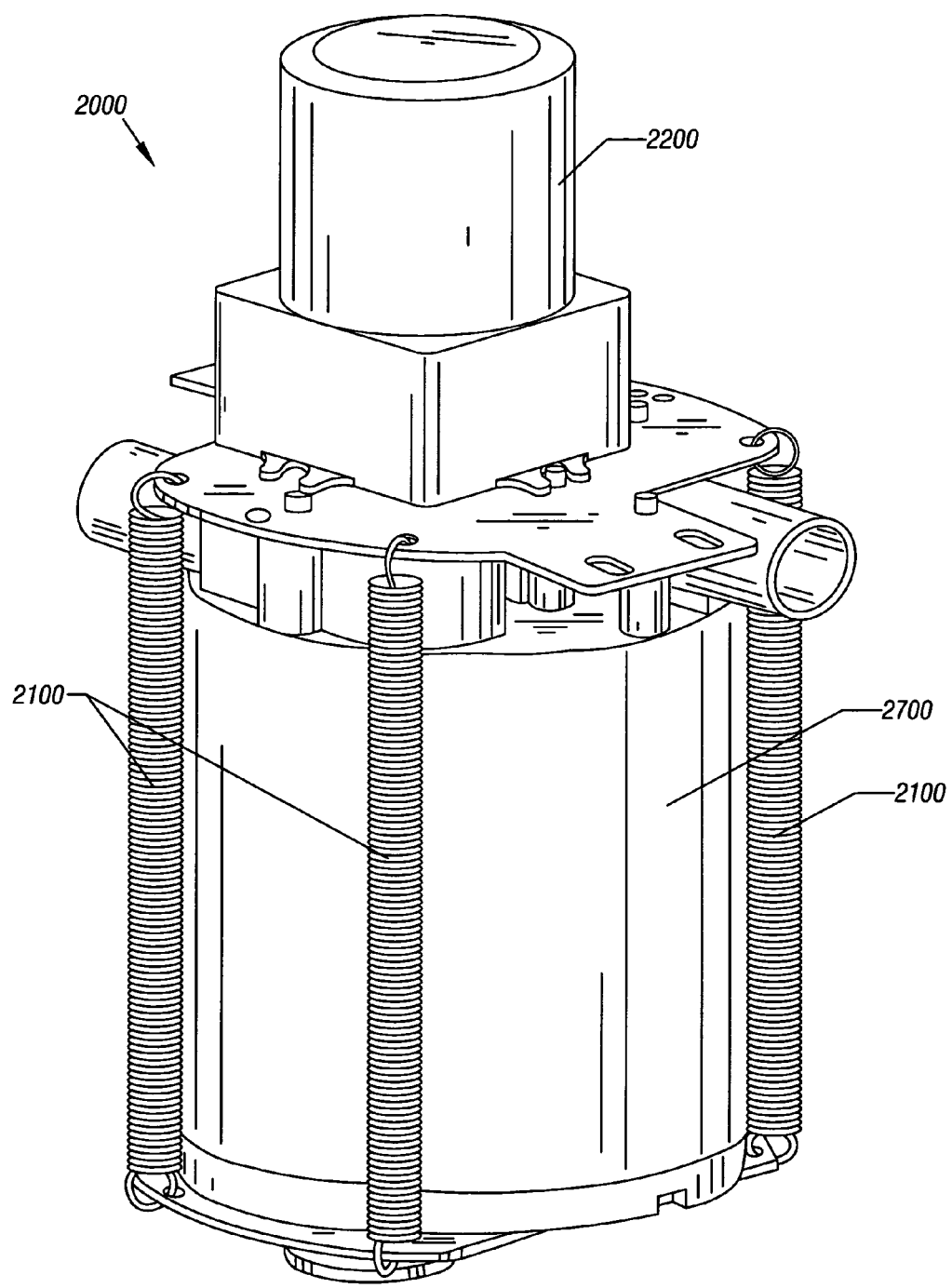
FIG. 7 shows a perspective view of an enthalpy wheel.
Figure 8:
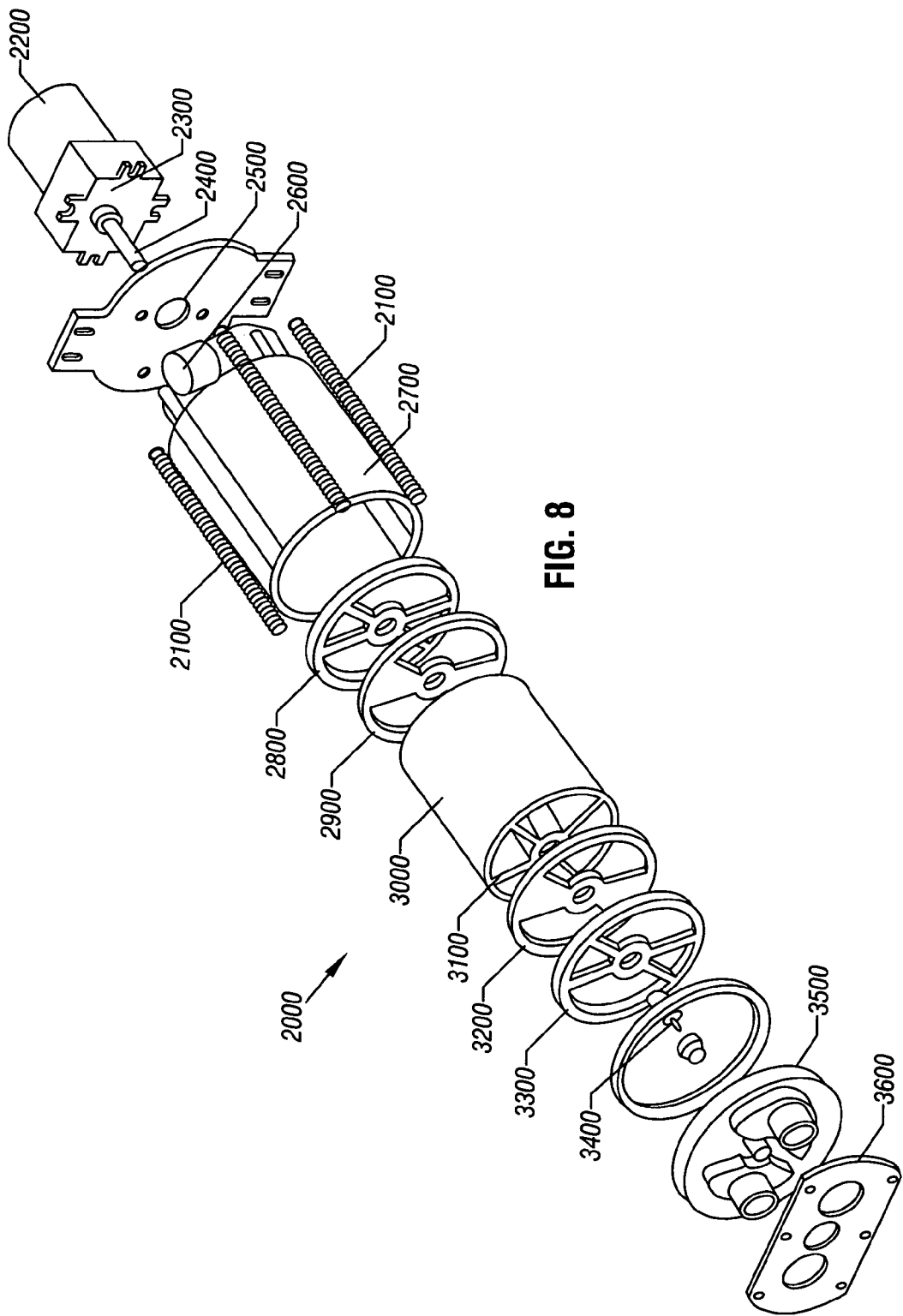
FIG. 8 shows an exploded view of an enthalpy wheel.

FIGS. 7 and 8 show perspective and exploded views of an alternate embodiment of an enthalpy wheel 2000 having springs 2100 located external to housing. Enthalpy wheel 2000 includes a motor/controller 2200, a gear reducer 2300, a drive shaft 2400, a bracket 2500, a hose barb 2600, outer housing 2700, a foam piece 2800 (e.g., a sponge), a plate 2900 (e.g., a fixed wear plate), a rotor 3000 containing desiccant 3100, a plate 3200 (e.g., a floating wear plate), a foam piece 3300 (e.g., a sponge), an idler shaft with seal 3400, an endplate 3500 (e.g., a floating endplate) and a bracket 3600 (e.g., a floating bracket).

External springs 2100 and foam pieces 2800 and 3300 can assist in keeping a relatively constant pressure on rotor 3000.

It may be desirable to control the rotational speed of the enthalpy wheel 100 so that the inlet dilution by carryover exhaust is reduced, and so that the dew point of the humidified stream leaving the enthalpy wheel 100 can be controlled. This can be accomplished by providing a variable speed motor 210 to enthalpy wheel 100 (FIG. 1).

Through normal operation, the enthalpy wheel dilutes oxygen to the cathode inlet by mixing fresh air from the blower with diluted air from the cathode exhaust. The amount of dilution is dependent on a number of factors including cathode airflow, cathode stoich, wheel volume, and wheel speed. Oxygen fraction decreases with increasing wheel speed and a diluted cathode inlet may reduce overall stack performance. Conversely, a slower wheel speed can result is a lower dew point of the humidified gas exhausted to the fuel cell. Therefore, since the humidified air stream fed to the fuel cell system should be saturated with water at the operating temperature of the stack in order to avoid drying out the membranes in the stack, the wheel speed must be kept above a desired threshold representing this condition.

Enthalpy wheel rotational speed can be varied proportional to the airflow rate to reduce carry-over from exit-to-inlet streams. The carry-over reduces the oxygen level in the inlet stream, and may produce undesirable effects within the fuel cell system. Enthalpy wheel rotational speed may be controlled proportional to the air inlet rate to maintain the fuel cell stack inlet O2 fraction of approximately 19% (it is within the scope of this invention that other oxygen percentages may be desirable and can be maintained depending on the system design). In a preferred embodiment enthalpy wheel rotational speed may vary from a range of 5 to 35 revolutions per minute depending on the airflow required by the fuel cell system and the flow volume of the enthalpy wheel. As an example, this range of wheel speeds can be achieved by controlling the voltage supplied to the wheel motor 210 (e.g., a range of 1 to 3 volts for the system described above).

Figure 9:
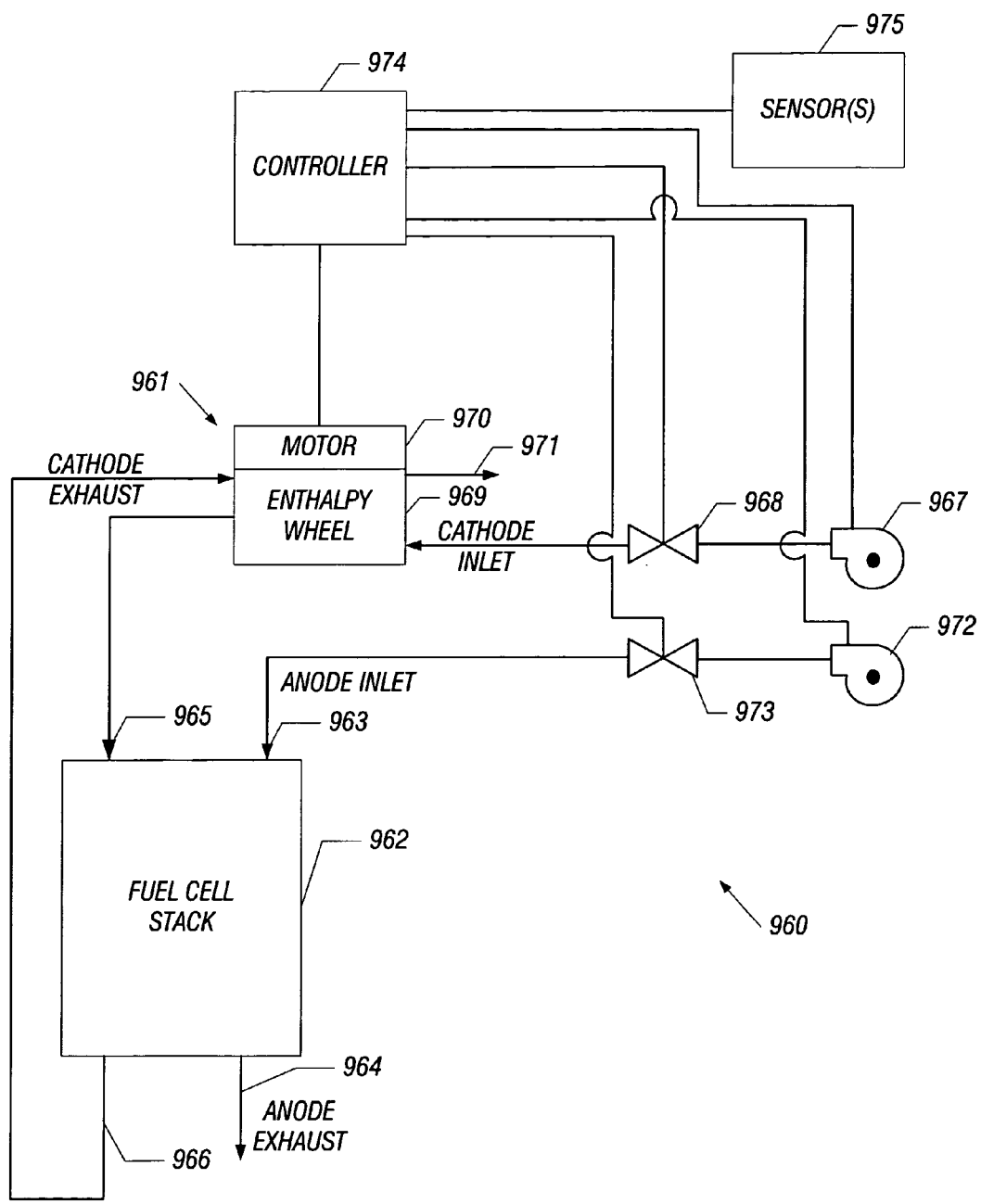
FIG. 9 is a schematic of a fuel cell system.
Figure 10:
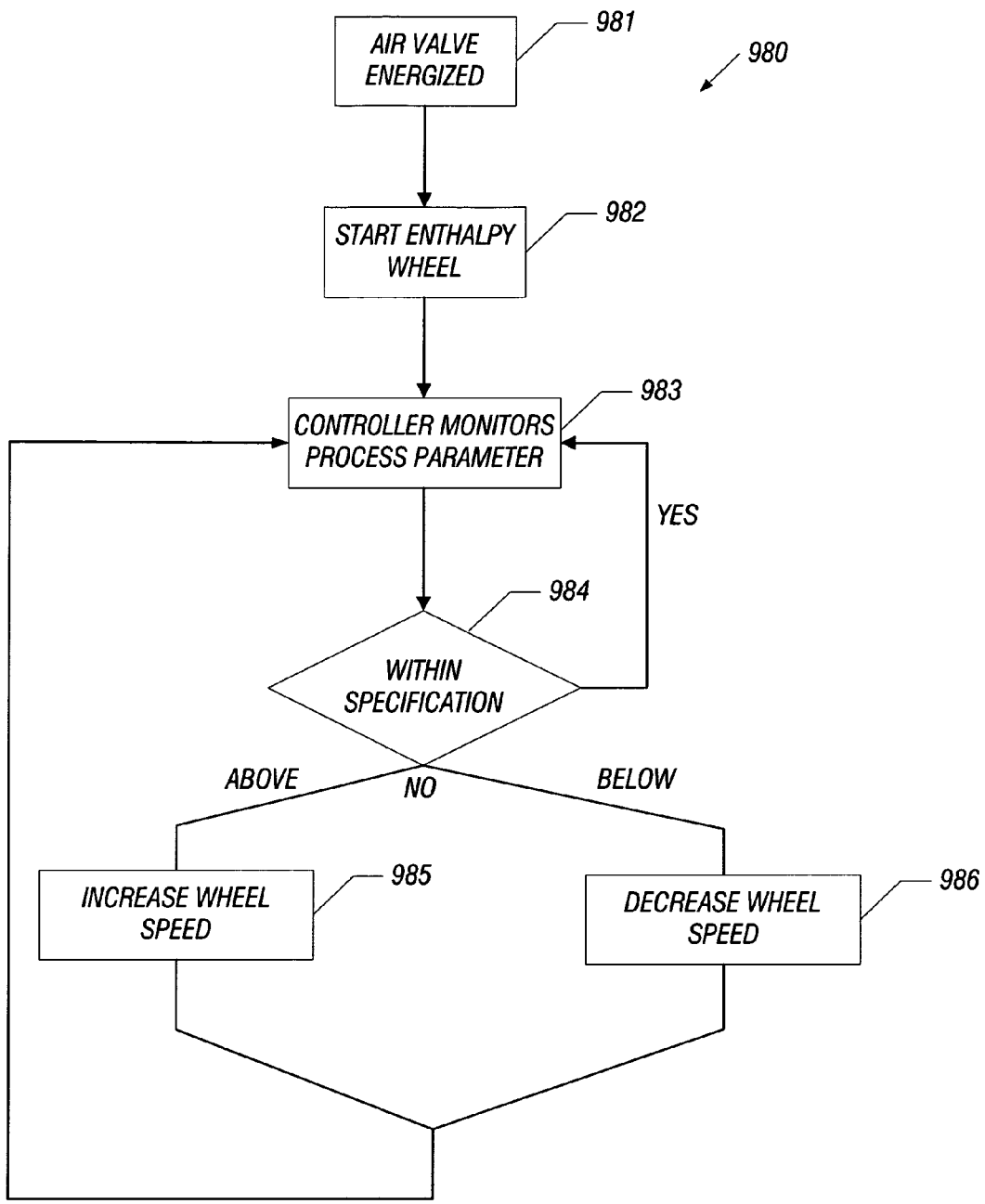
FIG. 10 is a flowchart.

One embodiment of a control scheme for controlling the rotational speed of an enthalpy wheel contained within a fuel cell system is illustrated in FIG. 9 with the corresponding control logic of FIG. 10.

Referring to FIG. 9, a schematic diagram is shown of a fuel cell system 960 with a dynamically controlled enthalpy wheel 961. Fuel Cell Stack 962 has an anode inlet 963, an anode outlet 964, a cathode inlet 965, and a cathode outlet 966. Blower 967 supplies air through valve 968 to enthalpy wheel 969 which is rotated buy motor 970. The air is heated and humidified as it passes through the enthalpy wheel 969, and it is then fed to cathode inlet 965. The cathode outlet 966 is flowed through the enthalpy wheel 969 and is exhausted via outlet 971. In the example shown in FIG. 9, the cathode exhaust is shown flowing through the enthalpy wheel in an opposite direction from the cathode inlet stream. In other embodiments, these streams may be flowed in the same direction.

Blower 972 supplies fuel (e.g., hydrogen or hydrogen-rich reformate) through valve 973 to anode inlet 963. The anode exhaust 964 is sent to an oxidizer (not shown) to oxidize any residual hydrogen to generate heat.

The enthalpy wheel motor 970 is controlled by controller 974, which is coupled to sensors 968 and 973, and to blowers 967 and 972. In this example, the controller 974 is also coupled to a network of sensors 975 that report various performance variables of the fuel cell system 960, such as output current, temperature and minimum cell voltage of the fuel cell stack 962. The air and fuel valves 968 and 973 (e.g. a solenoid valve w/ dual coils) are used to control the reactants streams either around the fuel cell stack 962 on startup and shutdown, or to the fuel cell stack 962 during normal operation. During startup, both valves 968 and 973 may be un-energized (closed) so that cathode air may be used elsewhere in the system. Hydrogen or reformate from the fuel processor or other fuel source may be diverted to an oxidizer to generate heat for steam generation and/or system warm-up heat. When the fuel cell system 960 is ready to begin current production both solenoids of valves 968 and 973 actuate at the same time to direct fuel and air to the stack 962. When air and fuel valves 968 and 973 are actuated, enthalpy wheel motor 970 is started.

The enthalpy wheel 969 starts rotating when the cathode air valve 968 is energized and airflow to the fuel cell stack 962 begins. Controller 974 send a signal to the enthalpy wheel motor 970 to begin rotation when it senses that air valve 968 is open. In this embodiment, the speed at which the wheel 969 is rotated is dependent upon the airflow from cathode blower 967. A look-up table may be used to determine wheel speed, or alternatively the speed can be determined by the controller based upon measurements taken from sensor network 975. In this example, the blower 967 is configured to maintain an air flow of 2 stoich over the entire current output range of the stack 962. At the full output of blower 967 (e.g., 2 stoich at the maximum power output the fuel cell stack 962 is designed for), the wheel is rotated at 33 revolutions per minute. For lower output levels, the speed of the motor 970 is reduced in direct proportion to the reduction of current drawn from the stack 962.

As another possible example, the controller 974 may defined a number of motor speed set points that are correlated to a number of power output set points. At maximum power output of the stack, the motor speed is adjusted to a first set point. In a power output range lower than the maximum but above a first threshold, the motor speed is adjusted to a second set point. In a power output range lower than the first threshold, but higher than a second threshold, the motor speed is adjusted to a third set point, and so one. It is generally preferable that relatively higher motor speeds are used as flow rates through the enthalpy wheel are increased. However, in some embodiments, relatively lower motor speeds can be used as flow rates through the enthalpy wheel are increased.

Referring to FIG. 10, a flow chart is shown depicting an example of logic 980 that can be employed by controller 974 to dynamically control the enthalpy wheel motor 970. In a first step 981, a determination is made whether air valve 968 is open. If the answer is yes, then in a second step 982, the enthalpy wheel motor is actuated. In a third step, the controller 974 monitors a process parameter, such as power output from stack 962. In a fourth step 984, a determination is made whether the process parameter is within a predetermined specification. For example, this may refer to determining whether the power output of the stack 962 is within a range corresponding to a desired rotation speed of enthalpy wheel 969. If the variable is within the desired specification range, then no action is taken. If the variable is above the desired specification range (e.g., the power output of the stack 962 is above a power output range associated with the speed of the enthalpy wheel 969), then the wheel speed is increased. Conversely, if the variable is below the desired specification range (e.g., the power output of the stack 962 is below a power output range associated with the speed of the enthalpy wheel 969), then the wheel speed is decreased.

Figure 11:
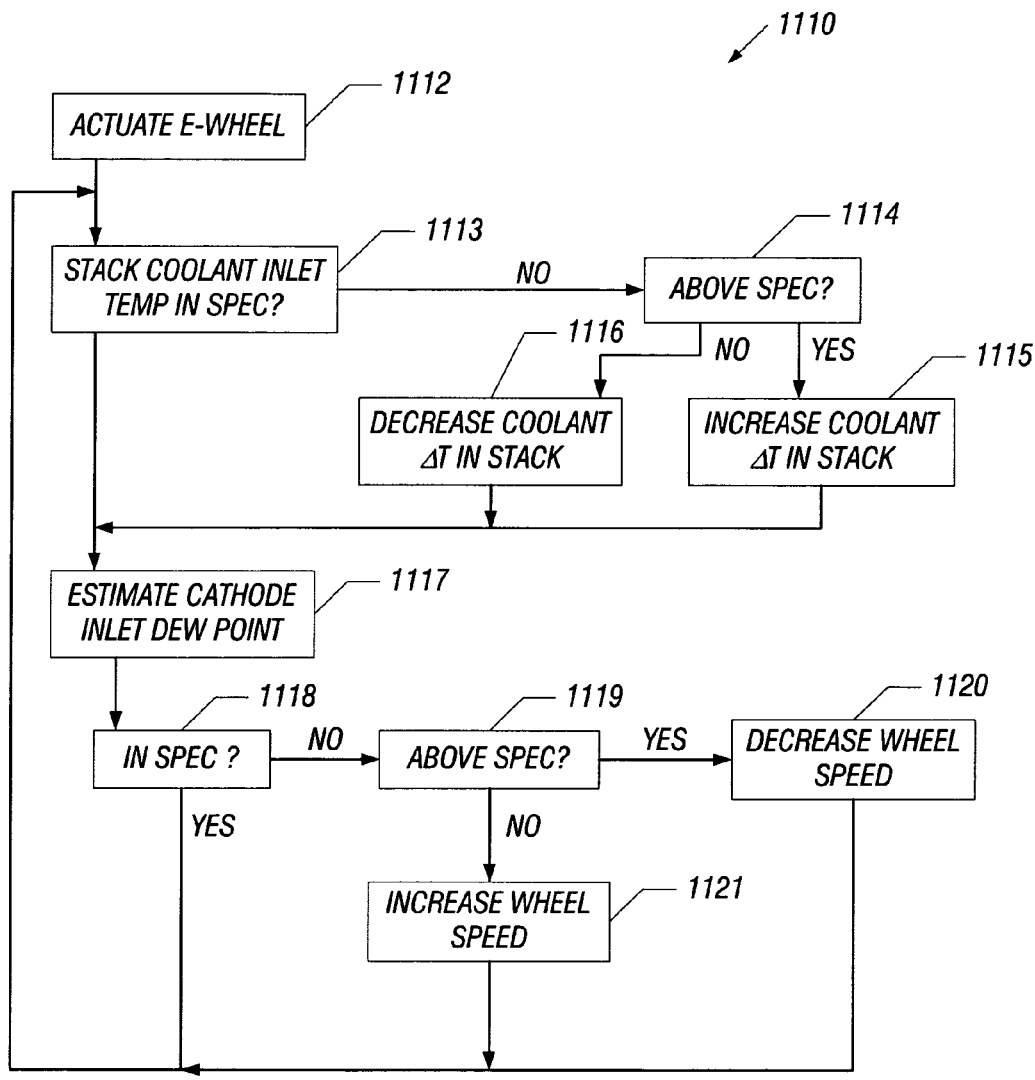
FIG. 11 is a flow chart.

Referring to FIG. 11, a flow chart is shown of a method 1110 of operating a fuel cell system. In a first step 1112, an enthalpy wheel system is actuated such that as previously described, temperature and humidity are exchanged between a cathode inlet stream and a cathode outlet stream. In a subsequent step 1113, a determination is made as to whether the stack coolant inlet temperature is within specification (e.g., whether it is 63° C. in the case of the system described above). If the stack coolant inlet temperature is not within specification, then step 1114 is performed, wherein a determination is made whether the stack coolant inlet temperature is above the specification threshold. If the temperature is above the threshold, then in step 1115 the coolant flow through the stack is increased to decrease the temperature rise of the coolant as it flows through the stack. If the temperature is not above the threshold, then in step 1116 the coolant flow through the stack is decreased to increase the temperature rise of the coolant as it flows through the stack.

In step 1117, the system utilizes a lookup table to estimate the dew point of the humidified gas fed from the enthalpy wheel to the fuel cell stack. In this example, the enthalpy wheel system has been characterized empirically, so that the dew point conditions of the humidified gas fed from the enthalpy wheel to the fuel cell stack are known for a wide variety of operating conditions. For example, this parameter can be affected by the output current of the stack, the stack inlet temperature of the coolant, the air flow rates and temperatures through the enthalpy wheel, etc. It will be appreciated that such process variables are generally interrelated, so that the enthalpy wheel performance can be characterized on the basis of any number of process parameters or combinations of process parameters.

In a preferred embodiment, the lookup table used to determine the appropriate enthalpy wheel speed is configured to provide the minimum wheel speed that will provide saturated gas to the fuel cell at a given stack operating temperature (e.g., indicated by stack coolant inlet temperature) and a given stack power output. In some cases, a table of such data may be regressed into a mathematical expression such that the wheel speed (e.g., the voltage supplied to the wheel motor) is determined accordingly.

In step 1118, the system determines whether the estimated cathode inlet dew point in within the specification. If so, then no action is taken, and the system repeats step 1113. If not, then a determination is made in step 1119 as to whether the estimated cathode inlet dew point is above specification. If so, then in step 1120 the wheel speed is decreased so that the resulting cathode inlet dew point will be decreased. If not, then in step 1121 the wheel speed is increased so that the resulting cathode inlet dew point will be increased. The system then repeats step 1113.

Such a method can also be expressed in alternate terms as including the following steps: (1) rotating a porous desiccant material about a rotational axis;

(2) flowing air through the desiccant material in a direction parallel to the rotational axis to a cathode inlet of a fuel cell; (3) flowing cathode exhaust from the fuel cell through the desiccant material; (4) monitoring a process performance variable; (5) detecting a change in a value of the process performance variable; and (6) varying a rotational speed of the desiccant material in response to the detected change in the value of the process performance variable.

Similarly, another embodiment of such a method can be expressed as including the following steps: (1) rotating an enthalpy wheel; (2) flowing cathode exhaust from a fuel cell stack through the enthalpy wheel; (3) flowing air through the enthalpy wheel to increase the humidity of the air; (4) flowing the humidified air from the enthalpy wheel to a cathode electrode chamber of the fuel cell stack;

(5) flowing hydrogen through an anode electrode chamber of the fuel cell stack to produce an amount of electrical current; (6) supplying the electrical current to a load; (7) increasing a rotational speed of the enthalpy wheel to increase a dew point temperature of the humidified air fed to the fuel cell from the enthalpy wheel; and (8) decreasing the rotational speed of the enthalpy wheel to decrease the dew point temperature of the humidified air fed to the fuel cell from the enthalpy wheel.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A method of operating a fuel cell system, comprising:
   rotating an enthalpy wheel;
   flowing cathode exhaust from a fuel cell stack through the enthalpy wheel;
   flowing air through the enthalpy wheel to increase the humidity of the air;
   flowing the humidified air from the enthalpy wheel to a cathode electrode chamber of the fuel cell stack;
   flowing hydrogen through an anode electrode chamber of the fuel cell stack to produce an amount of electrical current;
   supplying the electrical current to a load;

increasing a rotational speed of the enthalpy wheel to increase a dew point temperature of the humidified air fed to the fuel cell from the enthalpy wheel decreasing the rotational speed of the enthalpy wheel to decrease the dew point temperature of the humidified air fed to the fuel cell from the enthalpy wheel;

flowing a coolant through the fuel cell stack;

varying a stack inlet temperature of the coolant to maintain the stack inlet temperature of the coolant within a predetermined threshold; and varying the flow of the coolant through the stack to regulate a temperature differential between the stack inlet temperature of the coolant and a stack outlet temperature of the coolant.

2. The method of claim 1, further comprising:

varying the temperature differential to maintain a cathode inlet temperature higher than the stack coolant inlet temperature.

3. The method of claim 1, further comprising:

utilizing a lookup table to adjust the rotational speed of the enthalpy wheel according to a stack inlet temperature of the coolant.

4. The method of claim 1, further comprising:

utilizing a lockup table to adjust the rotational speed of the enthalpy wheel according to process variables including a stack inlet temperature of the coolant and the amount of electric current supplied to the load byte fuel cell.

5. A fuel cell system, comprising:

an enthalpy wheel assembly, wherein the assembly includes an enthalpy wheel coupled to a variable speed motor, wherein the motor is adapted to rotate the enthalpy wheel, wherein the assembly includes a first inlet, a first outlet, a second inlet, and a second outlet;

a fuel cell having a cathode inlet and a cathode outlet, wherein the cathode inlet is coupled to the first outlet of the enthalpy wheel assembly, wherein the cathode outlet is coupled to the second inlet of the enthalpy wheel assembly, wherein the first inlet of the enthalpy wheel is coupled to a supply of air, wherein the second outlet is adapted to vent cathode exhaust from the enthalpy wheel;

a sensor adapted to provide a signal indicative of at least one of an electrical parameter of the fuel cell, a temperature of the fuel cell and a temperature of a coolant received by the fuel cell; and a controller coupled to the motor and the sensor, the controller adapted to vary a speed of the motor in response to the signal, wherein the electrical parameter comprises an electrical cuirent output from the fuel cell.

6. A method of operating a fuel cell system, comprising:

rotating a porous desiccant material about a rotational axis;

flowing air through the desiccant material in a direction parallel to the rotational axis to a cathode inlet of a fuel cell;

flowing cathode exhaust from the fuel cell through the desiccant material;

monitoring a variable indicative of at least one of an electrical parameter of the fuel cell, a temperature of the fuel cell, and a temperature of a coolant received by the fuel cell; and controlling a rotational speed of the desiccant material in response to the variable, wherein the electrical parameter comprises an electrical current output from the fuel cell.

7. A system comprising:

a fuel cell;

an enthalpy wheel in which sir to and from the fuel cell is communicated;

a motor to rotate the enthalpy wheel; and a controller coupled to the motor to regulate a rotational speed of the enthalpy wheel in response to a parameter of the fuel cell other than a parameter associated with air that is routed from the enthalpy wheel to the fuel cell, wherein the parameter comprises a temperature of the fuel cell.

* * * * *

UNITED STATES PATENT AND TRADEMARK OFFICE
CERTIFICATE OF CORRECTION

PATENT NO. : 7,112,378 B2  Page 1 of 1
APPLICATION NO. : 10/264547
DATED : September 26, 2006
INVENTOR(S) : Elwood A. Eisler and David A. Gutenmann It is certified that error appears in the above-identified patent and that said Letters Patent is hereby corrected as shown below:

Column 11:
Line 10, "predetennined" should be --predetermined--;
Line 24, "lockup" should be --lookup--;
Line 27, "byte" should be --by the--;

Column 12:
Line 10, "cuirent" should be --current--;
Line 30, "sir" should be --air--.

Signed and Sealed this

Nineteenth Day of December, 2006

JON W. DUDAS
*Director of the United States Patent and Trademark Office*